(12) United States Patent
Elford et al.

(10) Patent No.: US 6,403,880 B1
(45) Date of Patent: Jun. 11, 2002

(54) GROUND STRAP FOR ELECTRICAL BOX

(75) Inventors: Douglas G. Elford, Coldwater; Joachim Feek, Whitby, both of (CA)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/563,237

(22) Filed: May 2, 2000

(51) Int. Cl.[7] .................................................. H05K 5/02
(52) U.S. Cl. ............................ 174/51; 174/6; 174/135; 439/92; 439/98; 361/799
(58) Field of Search .......................... 439/92, 100, 98, 439/106; 174/51, 89, 60, 135, 6, 78, 35 R, 40 CC; 361/799, 753

(56) References Cited

U.S. PATENT DOCUMENTS

| | | | | |
|---|---|---|---|---|
| 1,672,067 A | * | 6/1928 | Labre | 439/106 |
| 3,210,458 A | | 10/1965 | Palmer | 174/51 |
| 3,609,213 A | | 9/1971 | Winter et al. | 174/51 |
| 3,760,314 A | * | 9/1973 | Krasienko et al. | 174/51 X |
| 4,306,109 A | | 12/1981 | Nattel | 174/51 |
| 4,315,100 A | | 2/1982 | Haslbeck et al. | 174/51 |
| 4,865,556 A | | 9/1989 | Campbell et al. | 439/97 |

FOREIGN PATENT DOCUMENTS

CA 1260129 * 9/1989 .................. 174/51

* cited by examiner

*Primary Examiner*—Dean A. Reichard
*Assistant Examiner*—Dhiru R Patel
(74) *Attorney, Agent, or Firm*—Garrett V. Davis; Alfred N. Goodman

(57) ABSTRACT

An electrical box assembly includes an electrical box, a ground strap and a connecting member extending between adjacent ground straps. The electrical box includes coupling members on opposite end walls. The coupling members include a pair of opposing coupling tabs for engaging the ground strap. The ground strap includes coupling tabs formed on each side of the ground strap for wedging between the tabs of the coupling members to secure the ground strap to the electrical box by an interference fit. A connecting member can be clamped between the ground straps and the bottom wall of the electrical box to provide electrical connection between each of the ground straps.

39 Claims, 6 Drawing Sheets

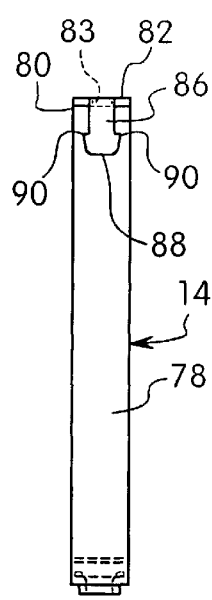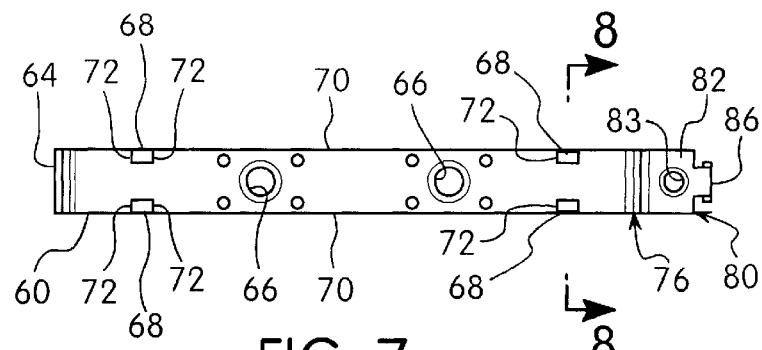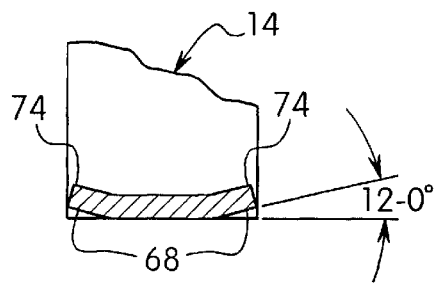
FIG. 6  FIG. 7  FIG. 8
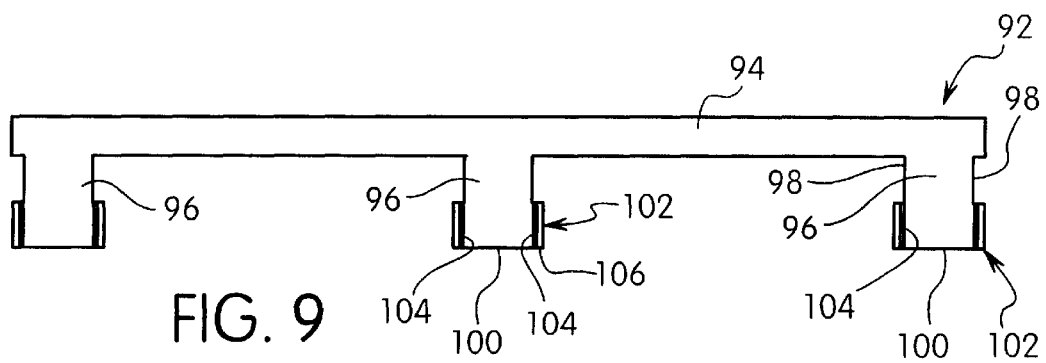
FIG. 9
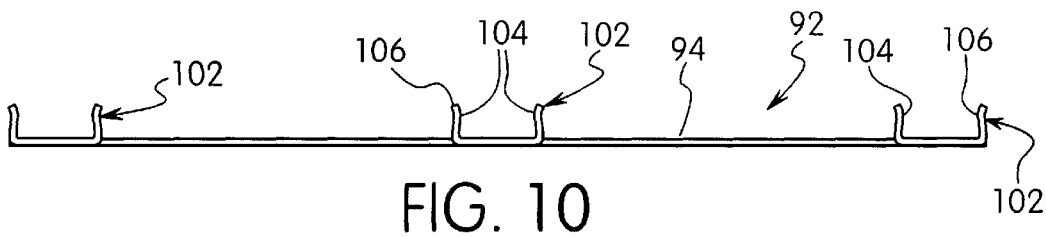
FIG. 10
FIG. 11

GROUND STRAP FOR ELECTRICAL BOX

FIELD OF THE INVENTION

The present invention is directed to an electrical box having a metal ground strap. More particularly, the invention is directed to a non-metallic electrical box having a metallic ground strap fixed to the electrical box for grounding an electrical device.

BACKGROUND OF THE INVENTION

Electrical boxes as known in the art are commonly used for supporting and enclosing electrical switches, connectors, receptacles and other electrical devices. The electrical boxes generally include suitable mounting hardware for mounting the box to a suitable support structure. The electrical boxes also include screw holes and mounting threads for mounting the electrical device within the box, and have various openings for feeding wires or cables into the electrical box.

In the past, electrical boxes were made exclusively of metal. Metal electrical boxes have the advantage that the boxes can be grounded directly to a ground wire. The electrical device, when attached to the metal electrical box, can be adequately grounded through the electrical box as well as by a standard ground wire.

In recent years, many electrical boxes have been made of plastic materials since they are lightweight, inexpensive and easily manufactured. Since plastic and other non-metallic materials used for making electrical boxes cannot be directly grounded, a suitable grounding system must be provided. Typically, a ground wire is passed through the electrical box and attached directly to the electrical device. However, since some electrical codes require the electrical box to be grounded, a grounding member is often coupled to the electrical box which can then be connected to a ground wire.

Non-metallic electrical boxes have also been provided with a metallic ground strap that is attached to the electrical box. One example of such a device is disclosed in U.S. Pat. No. 3,210,458 to Palmer. In this device, a metallic ground strap is attached to the side wall of the electrical box. The ground strap has a top end with an opening for receiving a screw or other fastener for attaching directly to the electrical device. The bottom end of the ground strap has a tab that extends through an opening in the bottom wall of the electrical box and is bent to secure the ground strap in place. The bottom end of the ground strap also includes a threaded hole for receiving a screw for attaching to a grounding wire.

Another form of ground strap is disclosed in U.S. Pat. No. 4,315,100 to Haslbeck et al. This device includes a non-metallic electrical box having a ground strap attached to the top end of the electrical box. The ground strap includes an opening for receiving a threaded fastener for coupling directly to the electrical box. A second threaded opening is provided at the opposite end of the ground strap for receiving a fastener for coupling directly to a ground wire.

The prior devices can be effective for grounding a single electrical device, but are not sufficient for grounding several electrical devices simultaneously. In addition, these devices can be difficult to assemble and do not comply with some electrical codes.

In view of the deficiencies of the prior electrical boxes and grounding systems, there is a continuing need in the industry for improved non-metallic electrical boxes.

SUMMARY OF THE INVENTION

The present invention is directed to a non-metallic electrical box having a metal ground strap. More particularly, the invention is directed to an electrical box having a ground strap for grounding an electrical device mounted in the box. Accordingly, a primary object of the invention is to provide an electrical box assembly including an electrical box and a ground strap where the ground strap is coupled directly to the electrical box.

Another object of the invention is to provide an electrical box assembly having an electrical box and a ground strap where the ground strap can be coupled to the electrical box without the use of fasteners or adhesives.

A further object of the invention is to provide an electrical box assembly having an electrical box and a ground strap where the ground strap is coupled to the electrical box by an interference fit.

Still another object of the invention is to provide an electrical box assembly having an electrical box and a ground strap where the electrical strap is wedged between two opposing surfaces formed in the electrical box for coupling the ground strap to the electrical box.

A further object of the invention is to provide an electrical box assembly having an electrical box and a ground strap where the ground strap includes a pair of coupling tabs for engaging opposing surfaces on the electrical box for attaching the ground strap to the electrical box.

Another object of the invention is to provide an electrical box assembly having an electrical box and a ground strap where the bottom wall of the electrical box includes a raised portion for supporting the ground strap so that one end of the ground strap is cantilevered with respect to the raised portion.

A further object of the invention is to provide an electrical box assembly having an electrical box and a ground strap being cantilevered with respect to a bottom wall to provide a spring action to assist in the ground strap wedging between two opposing coupling members.

Another object of the invention is to provide an electrical box assembly having an electrical box and a plurality of ground straps coupled to the electrical box and a connecting strap extending between each of the ground straps and coupled to the ground straps by a snap connection.

Still another object of the invention is to provide an electrical box assembly including an electrical box, a plurality of ground straps and a connecting strap having coupling devices for attaching to each of the ground straps.

The foregoing objects of the invention are basically attained by providing an electrical box assembly comprising: an electrical box having a bottom wall, a first end wall, and a second end wall. The first end wall has a coupling member with two spaced-apart opposing flanges extending inwardly into a cavity of the electrical box. Each of the flanges has an undercut portion in an opposing outer edge extending in a generally upward direction with respect to the bottom wall. A metallic ground strap has a length and a width. The ground strap is wedged between the opposing outer edge of the flanges to retain the ground strap against the bottom wall.

The objects and advantages of the invention are further attained by providing an electrical box assembly comprising: a non-metallic electrical box having a bottom wall, a first end wall and a second end wall, and a coupling member having two opposing coupling tabs on the bottom wall. A metallic ground strap has opposite side edges, each of the side edges has a coupling tab spaced from a first end of the ground strap. Each of the coupling tabs of the ground strap engages the coupling tabs of the electrical box.

The foregoing objects of the invention are further attained by providing an electrical box assembly comprising: a non-metallic electrical box having a bottom wall, a first end wall, a second end wall, and a plurality of coupling members, each of said coupling members having two opposing coupling tabs; a metallic ground strap coupled to each of said coupling members of said electrical box, each metallic ground strap positioned adjacent said bottom wall, said ground strap having opposite side edges, each of said side edges having a coupling tab spaced from a first end of said ground strap, and each of said coupling tabs of said ground strap engaging said coupling tabs of said electrical box for coupling said ground strap to said electrical box; and a metallic coupling member coupled to each of said ground straps.

The objects, advantages and other salient features of the invention will become apparent from the following detailed description in conjunction with the annexed drawings which form a part of this original disclosure.

BRIEF DESCRIPTION OF THE DRAWINGS

FIG. 6 is an end view of the ground strap in a preferred embodiment of the invention;

FIG. 7 is a top view of the ground strap of the embodiment of FIG. 6;

FIG. 8 is a cross-sectional view of the ground strap taken along line 8—8 of FIG. 7;

FIG. 9 is a top view of the connecting strap in a preferred embodiment of the invention;

FIG. 10 is a front view of the connecting strap of the embodiment of FIG. 9;

FIG. 11 is an end view of the connecting strap of the embodiment of FIG. 9;

DETAILED DESCRIPTION OF THE INVENTION

Figure 1:
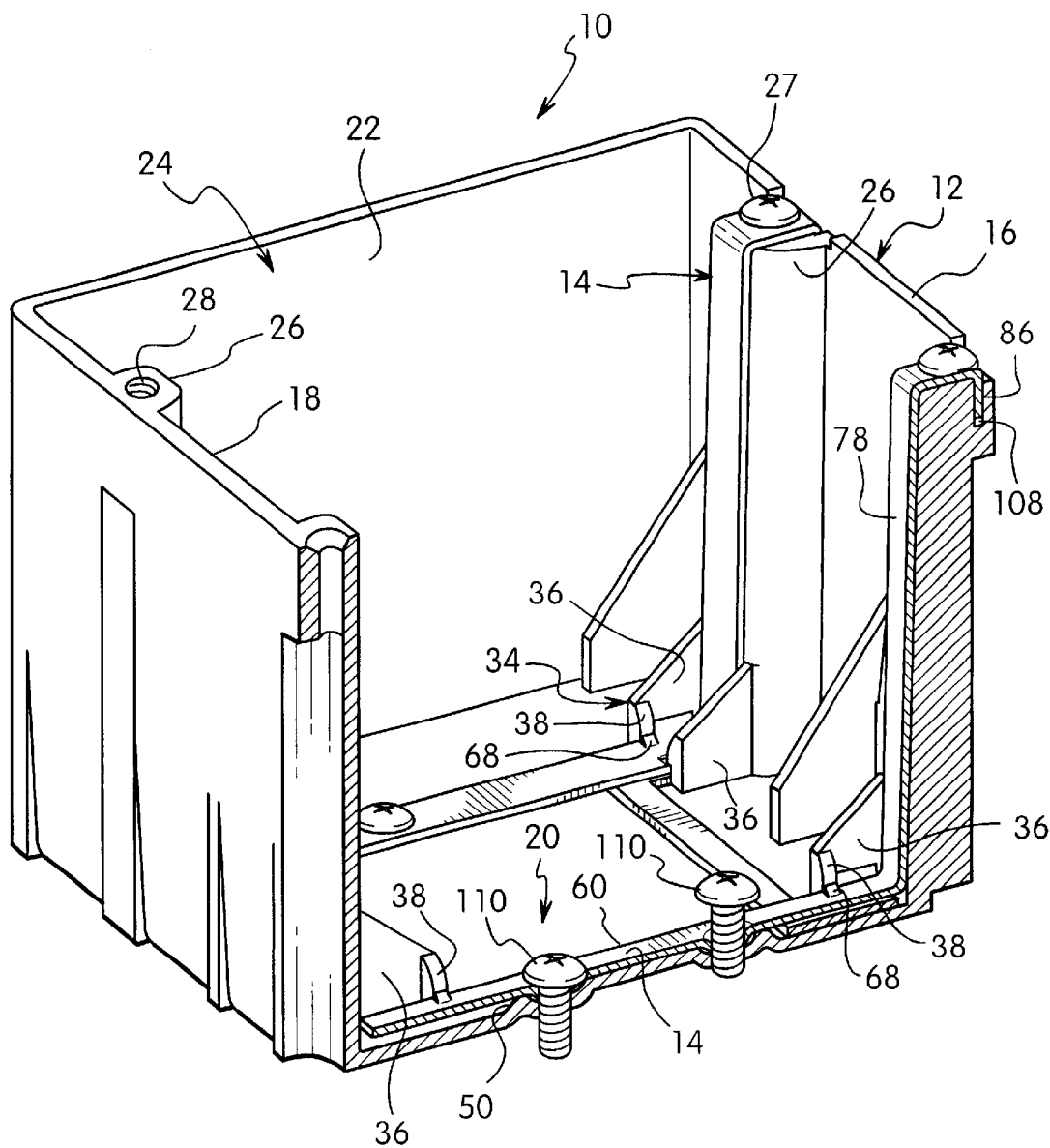
FIG. 1 is a perspective view in cross-section showing the electrical box assembly in one embodiment of the invention.

Referring to the drawings, the present invention is directed to an electrical box assembly 10 including an electrical box 12 and a ground strap 14. The invention is particularly directed to an electrical box assembly where the ground strap is coupled to the box and can provide a grounding path for an electrical device that is mounted in the box and provide a ground connection for the box.

Figure 2:
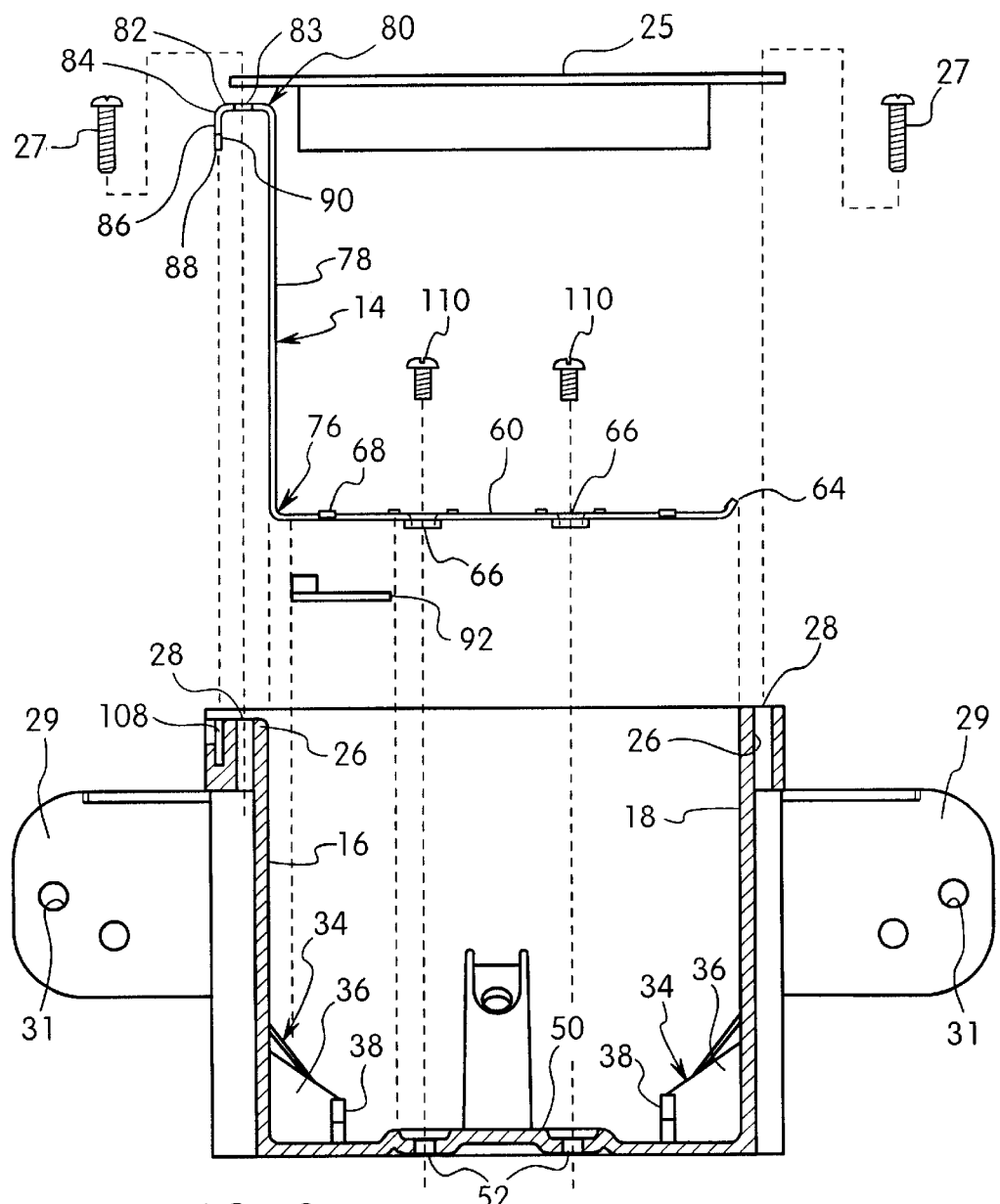
FIG. 2 is a side elevational view in cross-section showing the assembly including the electrical box, ground strap and connecting strap.

Electrical box 12 in the embodiment of FIG. 1 includes a first end wall 16 and a second end wall 18 integrally formed with a bottom wall 20. Side walls 22 are integrally formed with bottom wall 20 and first and second end walls 16 and 18, respectively. End walls 16 and 18 and side walls 22 define an open top end 24 of electrical box 12 for receiving an electrical device 25 as shown in FIG. 2. The electrical device can be, for example, an electrical receptacle or electrical switch as known in the art. Mounting arms 29 having apertures 31 extend from opposite ends of one side wall 22 for mounting electrical box 12 to a support, such as a wall stud, using nails, screws or other fasteners.

Figure 4:
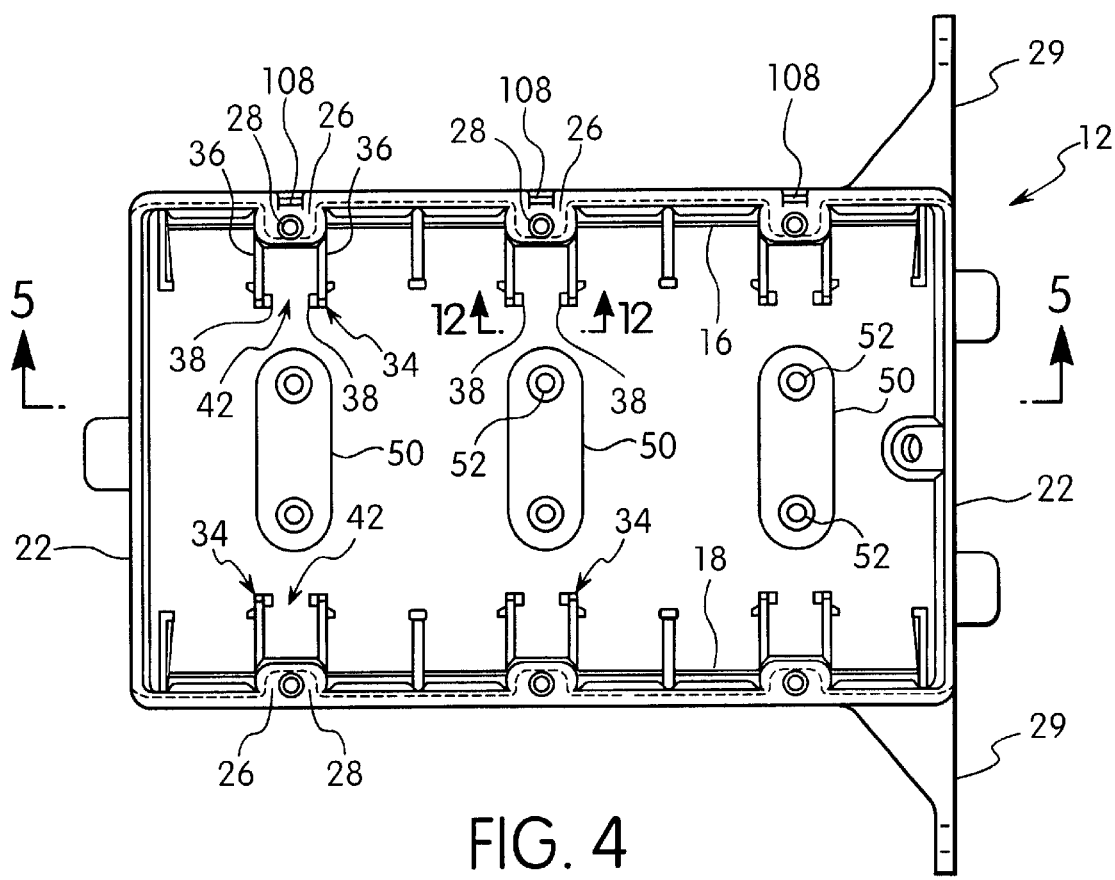
FIG. 4 is a top view of the electrical box in the embodiment of FIG. 1.
Figure 5:
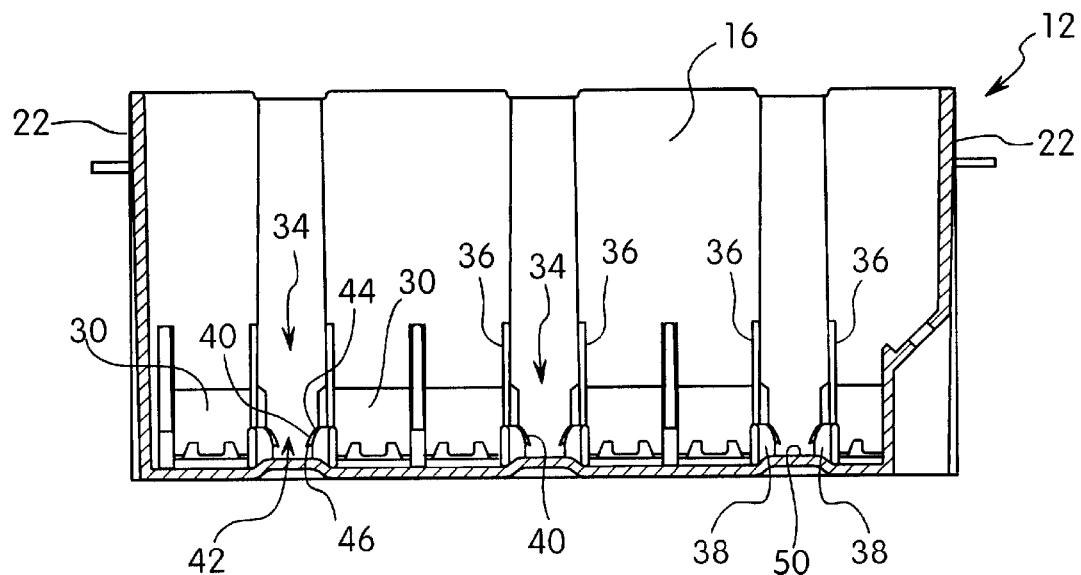
FIG. 5 is a cross-sectional view of the electrical box as seen along line 5—5 of FIG. 4.

Electrical box 12 in a first embodiment of the invention has a length and width to support three electrical devices 25 in a side-by-side fashion. In further embodiments, electrical box 12 can be dimensioned to support a single electrical device or a plurality of electrical devices depending on the particular installation. Each end wall 16 and 18 includes spaced-apart ears 26 having a threaded aperture 28 for receiving a threaded fastener 27 of electrical device 25. As shown in FIG. 4, ears 26 are oriented on each end wall 16 and 18 and are aligned in pairs to support opposite ends of an electrical device in a conventional manner and to define a mount for the respective electrical device. Each end wall 16 and 18 also includes a plurality of knock-out or pry-out members 30 adjacent bottom wall 20 for feeding wires or cables into the box 12 for coupling with electrical device 25.

In the embodiment illustrated, electrical box 12 is designed to support three electrical devices so that each end wall 16 and 18 includes three ears 26 having threaded apertures 28 spaced apart along the length of electrical box 12. Electrical box 12 also includes a coupling member 34 associated with each ear 26 and end walls 16 and 18. As shown in FIG. 4, coupling members are arranged on opposite end walls 16 and 18 in pairs for coupling with the ground strap 14. Each coupling member 34 includes a pair of parallel flanges 36 extending from the respective end wall 16 and 18 inwardly toward the cavity of electrical box 12. In preferred embodiments, flanges 36 are integrally formed with each end wall 16 and 18 and bottom wall 20 as shown in FIG. 1. Flanges 36 are aligned with a threaded aperture 28 of a respective ear 26 and spaced apart a suitable distance to accommodate ground strap 14 as discussed hereinafter in greater detail. As shown in FIG. 4, each flange 36 includes an inwardly extending coupling tab 38. Coupling tabs 38 of a respective coupling member have opposing side edges 40 defining a gap 42 between opposing coupling tabs 38.

Figure 12:
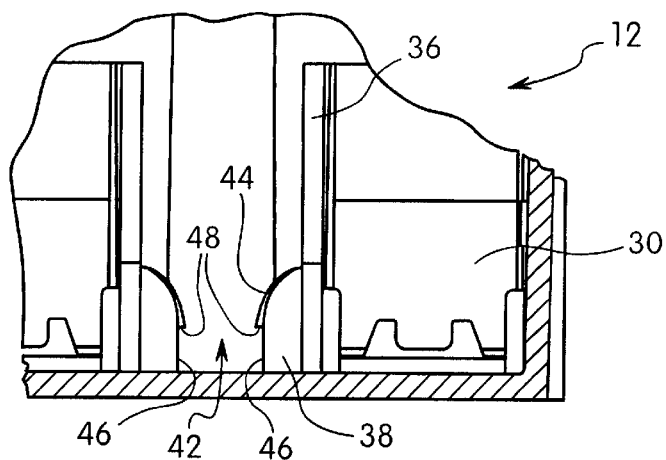
FIG. 12 is a partial side view in cross-section of the electrical box showing the coupling assembly for the ground strap.

In one embodiment shown in FIG. 12, coupling tabs 38 have a curved upper end 44 and a substantially straight side edge 46. Side edge 40 of coupling tab 38 includes an undercut portion 48 to define a ledge or shoulder for retaining the ground strap 14 when attached to electrical box 12. Undercut portion 48 forms a shoulder that engages tabs 68 of ground strap 14 and prevents ground strap 14 from separating from electrical box 12. In the embodiment illustrated, each side edge 46 is substantially perpendicular to bottom wall 20 so that gap 42 is formed by the two parallel side edges 46. In alternative embodiments, side edges 46 can be inclined with respect to bottom wall 20 so that side edges 46 of opposing coupling tabs 38 converge toward each other in a generally upward direction with respect to bottom wall 20.

Bottom wall 20 is substantially flat and extends between first and second end walls 16 and 18, respectively, and side walls 22 to close the bottom end of electrical box 12. As shown in FIG. 4, bottom wall 20 includes a raised portion 50 aligned with each pair of opposing coupling members 34 on end walls 16 and 18. Accordingly, three raised portions 50 are provided in bottom wall 20 as shown in FIG. 4. Preferably, raised portions 50 are integrally formed in bottom wall 20 and have a height slightly greater than the thickness of ground strap 14. A pair of spaced-apart apertures 52 are provided in raised portion 50 to receive a threaded screw.

Referring to FIG. 2, ground strap 14 has a generally L shape with a first leg 60 having a length substantially equal to the space between first end wall 16 and second end wall 18. As shown in FIG. 2, first leg 60 has a first end 62 with an upturned end portion 64. Two spaced apart holes 66 are punched in first leg 60 and spaced-apart a distance corresponding to the spacing between apertures 52 in raised portion 50 of bottom wall 20. Referring to FIG. 7, first leg 60 of ground strap 14 includes coupling tabs 68 on each side edge 70 of ground strap 14. Coupling tabs 68 are formed by cut lines 72 extending inwardly from side edges 70. As shown in FIG. 7, coupling tabs 68 are arranged in pairs on opposite sides of first leg 60. Referring to FIG. 8, coupling tabs 68 are bent upwardly out of the plane of first leg 60 to form a gripping edge 74. In the embodiment illustrated, coupling tabs 68 are bent upwardly at an angle of about 12 degrees so that gripping edge 74 is able to engage tabs 38 on flanges 36.

As shown in FIG. 2, first leg 60 of ground strap 14 includes a second end 76 opposite first end 60. A second leg 78 extends from second end 76 in a direction generally perpendicular to first leg 60 and terminates at a top end 80. Second leg 78 has a length corresponding substantially to the height of first end wall 16. A top portion 82 is coupled to top end 80 and extends from top end 80 in a direction generally parallel to first leg 60. Top portion 82 includes an aperture 83 for receiving a mounting screw and an outer end 84 coupled to a coupling tab 86. As shown in FIG. 6, coupling tab 86 extends downwardly from top portion 82 parallel to second leg 78 and terminates at a bottom end 88. Coupling tab 86 has a width less than the width of top portion 82 and includes hook members 90 extending outwardly from opposite sides of coupling tab 86.

In the embodiment of FIG. 1, a connecting member 92 is provided to connect each of the ground straps 14 together. Connecting member 92 as shown in FIGS. 9–11 has a main body portion 94 and three spaced-apart legs 96. Legs 96 in the preferred embodiments have a width substantially equal to the width of ground strap 14. Each leg 96 extends from a side edge 98 of body portion 94 in a direction generally perpendicular to the longitudinal axis of body portion 94 and terminates at an outer edge 100. Each leg 96 includes two spring-like coupling members 102 adjacent outer edge 100 and extends in a generally upward direction from the plane of legs 96. As shown in FIG. 10, coupling members 102 have a slightly curved shape with a convex inner face 104 facing each other and an outer edge 106. Inner face 104 is curved to guide ground strap 14 between opposing legs 96 and snap into a coupling engagement.

Figure 13:
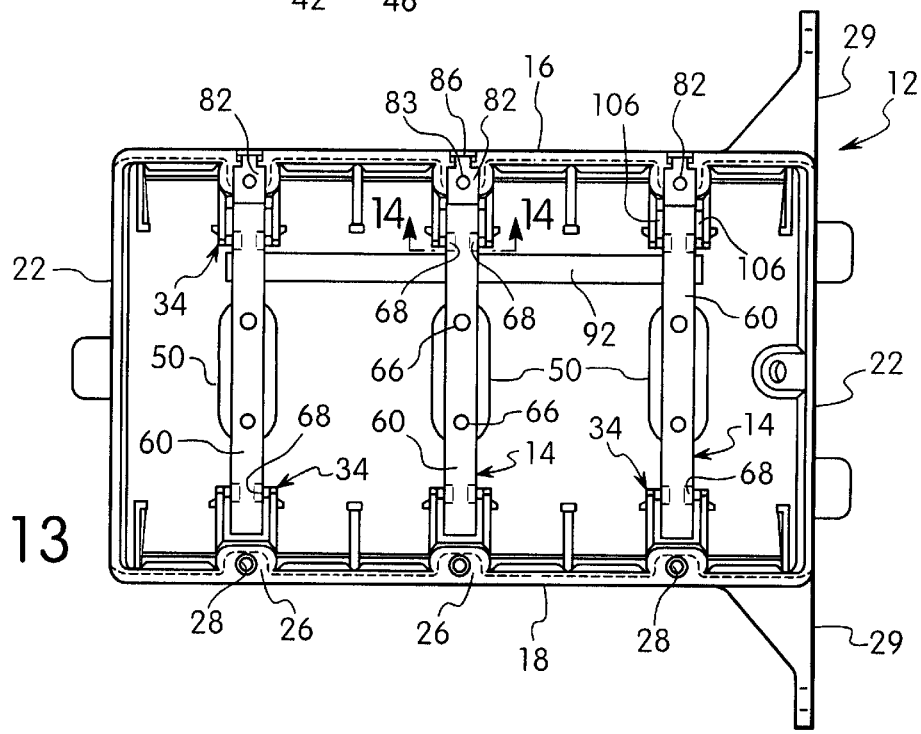
FIG. 13 is a top view of the assembly showing the electrical box, ground strap and connecting strap.

Electrical box assembly 10 is assembled by positioning connecting member 92 adjacent bottom wall 20 of electrical box 12 as shown in FIGS. 1 and 13. Connecting member 92 is positioned adjacent coupling members 34 with coupling tabs 102 of connecting member 92 positioned between opposing flanges 36 of coupling member 34. Coupling tabs 102 of connecting member 92 are dimensioned to fit within the space between coupling tabs 38 of coupling member 34 and first end wall 16. Coupling tabs 102 preferably are dimensioned to form a friction fit between flanges 36 to retain connecting member 92 within electrical box 12.

Figure 14:
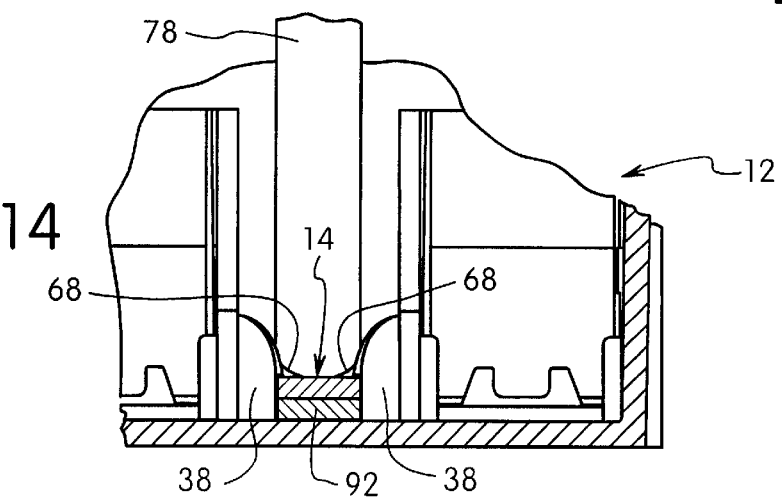
FIG. 14 is a side view in cross-section showing the ground strap and connecting strap coupled to the electrical box.

After connecting member 92 is coupled to electrical box 12, ground strap 14 is positioned within electrical box 12 as shown in FIG. 1. Ground strap 14 is positioned with first leg 60 supported on raised portion 50 of bottom wall 20. Coupling tabs 86 of first leg 60 of ground strap 14 are wedged between coupling tabs 38 of coupling member 34 to secure ground strap 14 to electrical box 12. Simultaneously, first leg 60 of ground strap 14 is snapped between tabs 102 of connecting member 92. As shown in FIG. 14, each gripping edge 74 of coupling tabs 86 extends in a generally upward direction to engage side edges 40 of tabs 38 and bite into tabs 38. As shown in FIG. 1, the first end 62 and second end 76 of first leg 60 are cantilevered with respect to raised portion 50 and bottom wall 20. In this fashion, ends 62 and 76 can be pushed downwardly toward bottom wall 20 to flex first leg 60 at the point of contact of raised portion 50 of bottom wall 20. When the downward pressure is released, the resilient properties of ground strap 14 cause ends 62 and 76 to spring upwardly so that gripping edges 74 of tabs 68 bite into tabs 38 of coupling members 34. In this manner, the cantilevered ends assist in the wedging of ground strap 14 into tabs 38. Undercut portion 48 of coupling tabs 38 also assist in retaining ground strap 14 against bottom wall 20 and resist separation of ground strap 14 from electrical box 12.

Figure 3:
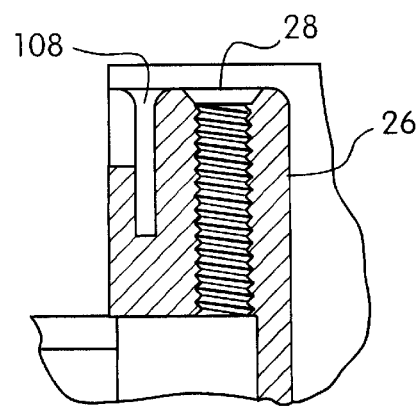
FIG. 3 is a partial side elevational view in cross-section showing the top end of the electrical box and the recess for coupling with the ground strap.

Referring to FIGS. 2 and 3, first end wall 16 of electrical box 12 includes a recess 108 adjacent threaded aperture 28 in ears 26. As shown in FIG. 1, coupling tab 86 of ground strap 14 is inserted into recess 108 whereby hooks 90 engage the inner surfaces of recess 108 and couple ground strap 14 to electrical box 12.

As shown in FIGS. 1 and 2, an electrical device 25 is mounted in electrical box 12 in a conventional manner by screws 27 that mate with the threaded apertures 28 in ears 26. The electrical device 25 is mounted to overlie the top surface of end walls 16 and 18 so that the electrical device 25 is coupled directly to the top portion 82 of ground strap 14 by inserting screws 27 through an aperture in top portion 82. Mounting screws 110 or other fasteners extend through holes 66 in ground strap 14 and holes 52 in raised portion 50 for mounting electrical box 12 on a suitable support surface. In embodiments of the invention, a ground wire (not shown) is fed through an opening formed by removing knock-out 30 and clamped between mounting screws 110 and ground strap 14 to provide an effective grounding path for the ground strap 14 and electrical device 25. A ground wire can also be coupled directly to electrical device 25 in addition to the ground strap 14 depending on the electrical code.

Figure 15:
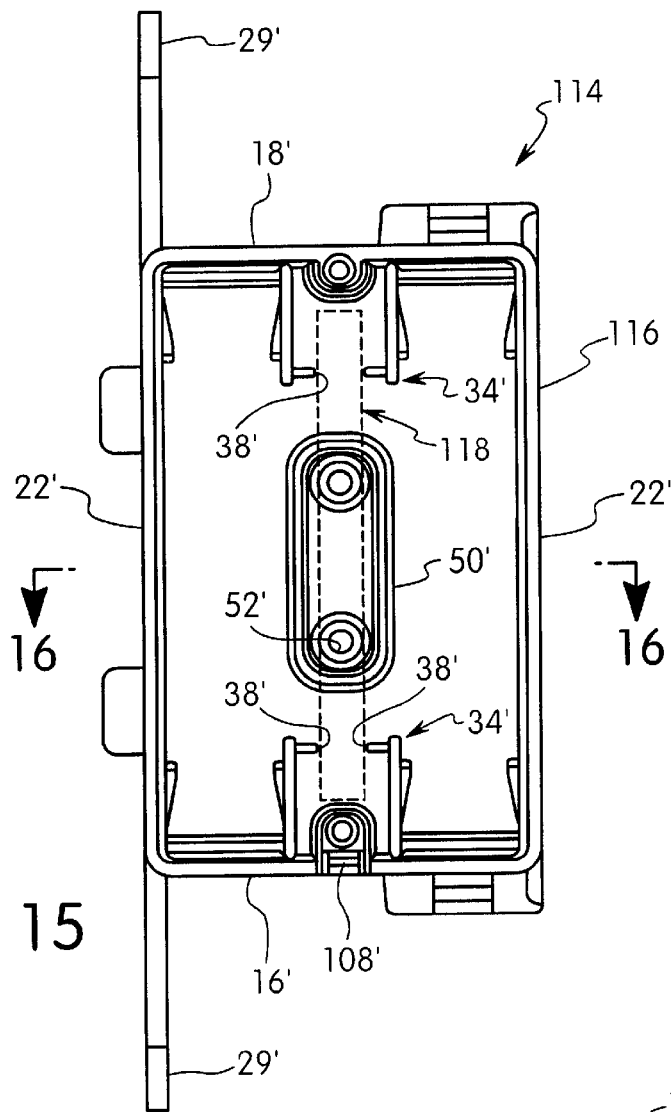
FIG. 15 is a top view of an electrical box in a second embodiment of the invention.
Figure 16:
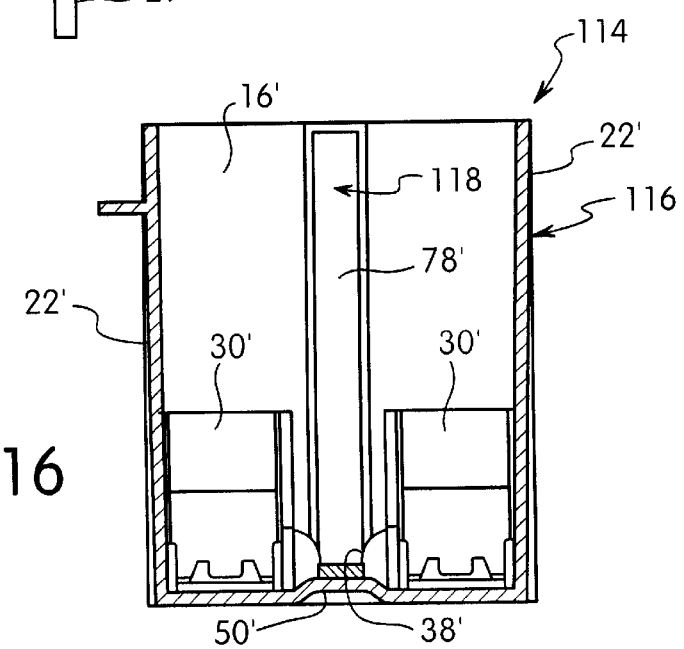
FIG. 16 is an end view in cross-section of the electrical box of FIG. 15 showing the coupling system for the ground strap.

FIGS. 15 and 16 show a second embodiment of the electrical box assembly 114. Electrical box assembly 114 includes an electrical box 16 and a ground strap 118. Electrical box 116 is similar to electrical box 12 except that electrical box 116 is dimensioned to support a single electrical device (not shown in FIGS. 15 and 16). Accordingly, identical components are identified by the same reference number with the addition of a prime. As shown in FIG. 15, ground strap 118 is coupled to electrical box 116 in a manner substantially the same as in the embodiment of FIG. 1. In this embodiment, since a single ground strap 118 is provided for a single electrical device, a separate connecting member extending between adjacent ground straps is not needed.

While several embodiments have been chosen to illustrate the invention, it will be appreciated by those skilled in the art that various modifications and changes can be made to the assembly without departing from the scope of the invention as defined in the appended claims.

What is claimed is:

1. An electrical box assembly comprising:
    an electrical box having a bottom wall, a first end wall, and a second end wall, said first end wall having a first coupling member with two spaced-apart opposing tabs extending inwardly into a cavity of said electrical box, each of said tabs having an opposing outer edge extending in a generally upward direction with respect to said bottom wall and defining a gap between said tabs, said opposing outer edges having an undercut portion spaced from said bottom wall; and
    a metallic ground strap having a length and a width, said ground strap being wedged between said opposing outer edges of said tabs between said undercut portion and said bottom wall to retain said ground strap against said bottom wall.

2. The electrical box assembly of claim 1, further comprising flanges coupled to said first end wall and to said bottom wall, wherein said tabs are coupled to one of said respective flanges.

3. The electrical box assembly of claim 1, said electrical box further comprising first and second side walls extending between said first and second end walls, and wherein said tabs are spaced from said side walls.

4. The electrical box assembly of claim 1, wherein said second end wall includes a second coupling member having two spaced-apart flanges extending inwardly into said cavity of said electrical box, said ground strap being wedged between said flanges on said second end wall.

5. The electrical box assembly of claim 4, wherein each of said flanges on said second end wall have an opposing tab, and wherein said ground strap is wedged between said tabs.

6. The electrical box assembly of claim 4, wherein each of said flanges of said second coupling member on said second end wall has an opposing edge with an undercut portion for retaining said ground strap against said bottom wall.

7. The electrical box assembly of claim 1, wherein said ground strap has a first leg adjacent said bottom wall, and said first leg is wedged between said tabs.

8. The electrical box assembly of claim 7, wherein said first leg includes first and second longitudinal side edges, a first coupling tab in said first side edge and a second coupling tab in said second side edge and opposite said first coupling tab, said first and second coupling tabs being wedged between said opposing outer edges of said tabs.

9. The electrical box assembly of claim 8, wherein said first and second coupling tabs of said ground strap are bent upwardly from a plane of said first leg of said ground strap.

10. The electrical box assembly of claim 7, wherein said ground strap includes a second leg coupled to a first end of said first leg and extending adjacent said first end wall, and a top portion extending from a top end of said second leg and over a top end of said first end wall, said top portion having a screw hole for receiving a screw of an electrical device.

11. The electrical box assembly of claim 10, further comprising a coupling tab extending from said top portion of said ground strap, and wherein said first end wall has a top end with a recess, said coupling tab of said ground strap being coupled to said first end wall in said recess.

12. The electrical box assembly of claim 7, wherein said bottom wall of said electrical box has a raised portion supporting said first leg of said ground strap, said first leg of said ground strap having at least one end cantilevered from said raised portion.

13. An electrical box assembly comprising:
    a non-metallic electrical box having a bottom wall, a first end wall, a second end wall, and a coupling member having two opposing coupling tabs; and
    a metallic ground strap positioned adjacent said bottom wall, said ground strap having opposite side edges, each of said side edges having a coupling tab spaced from a first end of said ground strap, and each of said coupling tabs of said ground strap engaging said coupling tabs of said electrical box for coupling said ground strap to said electrical box.

14. The electrical box assembly of claim 13, wherein said coupling tabs of said ground strap extend outwardly from a plane of said ground strap in a generally upward direction with respect to said bottom wall.

15. The electrical box assembly of claim 13, wherein said coupling tabs of said ground strap have an outer edge for engaging said coupling tabs on said electrical box in an interference fit to couple said ground strap to said electrical box.

16. The electrical box assembly of claim 15, wherein said bottom wall of said electrical box includes a raised portion for supporting a first portion of said ground strap at a location spaced from said coupling tabs on said ground strap, wherein said first end of said ground strap and said coupling tabs are cantilevered with respect to said raised portion.

17. The electrical box assembly of claim 13, wherein each of said coupling tabs of said electrical box have a side edge for engaging said ground strap, said side edges having an undercut portion.

18. The electrical box assembly of claim 17, wherein said opposing coupling tabs are substantially parallel to each other.

19. The electrical box assembly of claim 13, wherein said electrical box comprises a plurality of said coupling members spaced apart along said first end wall, each of said coupling members having a respective ground strap coupled thereto; and
    a metallic connecting member coupled to each of said ground straps.

20. The electrical box assembly of claim 19, wherein said connecting member includes a body portion and a plurality of leg portions, each of said leg portions being coupled to said coupling members of said electrical box.

21. The electrical box assembly of claim 20, wherein each of said leg portions of said connecting member have a first and second side edge and an upwardly extending tab coupled to each side edge, said upwardly extending tabs being spaced apart a distance for coupling to said ground strap.

22. The electrical box assembly of claim 21, wherein said tabs on said leg portions of said connecting member define a snap connection with said ground strap.

23. The electrical box of claim 13, wherein said electrical box has a cavity and said opposing coupling tabs extend inwardly into said cavity.

24. The electrical box of claim 13, wherein said first end of said metallic ground strap extends between said opposite side edges.

25. The electrical box of claim 13, wherein said opposite side edges of said metallic ground strap extend in a longitudinal direction with respect to said metallic ground strap.

26. The electrical box of claim 13, wherein each of said coupling tabs of said metallic ground strap have an outer edge coupled to a respective coupling tab of said non-metallic electrical box.

27. The electrical box of claim 13, wherein each of said opposing coupling tabs of said coupling member have an opposing side edge, and wherein each of said coupling tabs of said metallic ground strap engage a respective one of said side edges of said coupling tabs.

28. The electrical box of claim 27, wherein said metallic ground strap is coupled to said electrical box between said opposing side edges of said coupling tabs of said coupling member.

29. An electrical box assembly comprising:
   a non-metallic electrical box having a bottom wall, a first end wall, a second end wall, and a plurality of coupling members, each of said coupling members having two opposing coupling tabs;
   a metallic ground strap coupled to each of said coupling members of said electrical box, each said metallic ground strap positioned adjacent said bottom wall, said ground strap having opposite side edges, each of said side edges having a coupling tab spaced from a first end of said ground strap, and each of said coupling tabs of said ground strap engaging said coupling tabs of said electrical box for coupling said ground strap to said electrical box; and
   a metallic coupling member coupled to each of said ground straps.

30. The electrical box assembly of claim 29, wherein said coupling tabs of said ground strap have an outer edge for engaging said coupling tabs on said electrical box in an interference fit to couple said ground strap to said electrical box.

31. The electrical box assembly of claim 30, wherein said bottom wall of said electrical box includes a raised portion for supporting a first portion of said ground strap at a location spaced from said coupling tabs on said ground strap, wherein said first end of said ground strap and said coupling tabs are cantilevered with respect to said raised portion.

32. The electrical box of claim 31, wherein said first end of said ground strap is cantilevered whereby pushing downward on said first end results in a spring effect causing said coupling tabs on said ground strap to wedge against said coupling tabs on said electrical box.

33. The electrical box assembly of claim 29, wherein each of said coupling tabs of said electrical box have a side edge for engaging said ground strap, said side edges having an undercut portion.

34. The electrical box assembly of claim 29, wherein said connecting member includes a body portion and a plurality of leg portions, each of said leg portions being coupled to said coupling members of said electrical box.

35. The electrical box assembly of claim 34, wherein each of said leg portions of said connecting member have a first and second side edge and an upwardly extending tab coupled to each side edge, said upwardly extending tabs being spaced apart a distance for coupling to said ground strap.

36. The electrical box assembly of claim 35, wherein said tabs on said leg portions of said connecting member define a snap connection with said ground strap.

37. An electrical box assembly comprising:
   a non-metallic electrical box having a bottom wall, a first end wall, a second end wall, and a coupling member having a first coupling tab and an opposing second coupling tab, said bottom wall having a raised portion; and
   a metallic ground strap positioned adjacent said raised portion of said bottom wall, said ground strap having a first end, and a first side edge and a second side edge, said metallic ground strap having a width so that said first side edge and said second side edge engage said first coupling tab and said second coupling tab, respectively, of said electrical box for coupling said ground strap to said electrical box, said metallic ground strap having a first portion spaced from said first end and being supported by said raised portion of said bottom wall so that said first end of said metallic ground strap is cantilevered with respect to said raised portion.

38. The electrical box assembly of claim 37, wherein said first side edge of said metallic ground strap includes a first coupling tab engaging said first coupling tab of said electrical box and said second side edge of said ground strap includes a second coupling tab engaging said second coupling tab of said electrical box.

39. The electrical box assembly of claim 38, wherein said first coupling tab and said second coupling tab of said metallic ground strap contact said first coupling tab and said second coupling tab of said electrical box by an interference fit.

* * * * *